United States Patent [19]

Moosberg

[11] 4,011,774
[45] Mar. 15, 1977

[54] GEAR WHEEL CASING

[75] Inventor: Börje Sigurd Moosberg, Morrum, Sweden

[73] Assignee: Abu Aktiebolag, Svangsta, Sweden

[22] Filed: Nov. 3, 1975

[21] Appl. No.: 628,396

[30] Foreign Application Priority Data

Nov. 13, 1974 Sweden .............................. 7414235

[52] U.S. Cl. ........................... 74/606 R; 74/421 R; 242/84.1 R; 242/84.2 R
[51] Int. Cl.² ................... F16H 57/02; A01K 89/00
[58] Field of Search ................ 242/84.1 R, 84.2 R, 242/84.2 J, 84.21 R, 84.1 A; 74/606, 421 R, 412 R

[56] References Cited

UNITED STATES PATENTS 3,794,264   2/1974   Hull ................................ 242/84.2

*Primary Examiner*—Leonard H. Gerin

[57] ABSTRACT

This invention relates to a gear wheel casing for mounting in an apparatus, particularly a fishing reel. According to a preferred embodiment, the casing is in the form of a capsule comprising a cylindrical wall dimensioned to accommodate a single gear wheel and having an opening which is sufficiently wide to permit mounting of the gear wheel in the capsule but is sufficiently small to provide the capsule with a pronounced tendency to retain a gear wheel placed therein for permitting easy handling of the capsule and the gear wheel as a unit. Moreover, the cylindrical capsule wall has such an inner diameter that a gear wheel for which the capsule is dimensioned, projects, after its insertion in the capsule, through the opening a sufficiently great portion of its circumference to permit engagement with another gear wheel outwardly of the capsule which also comprises end walls for axially retaining the gear wheel, at least one of the end walls having an opening which is provided to permit insertion of a gear wheel shaft.

4 Claims, 4 Drawing Figures

GEAR WHEEL CASING

The present invention relates to gear wheel casing for mounting in an apparatus particularly a fishing reel.

A number of apparatuses of different types are provided with gear wheel mechanisms within highly restricted spaces which often are accessible only with great difficulty and therefore may give rise to assembly problems. An example of such an apparatus is a spinning reel for fishing.

A principal object of the invention is to provide a simple compact gear wheel casing to facilitate the handling of, in particular, small gear wheels in conjunction with the assembly and dismounting of the parts of an apparatus or in conjunction with the dismounting and mounting of the gear wheels on service and maintenance.

Another object of the invention is to provide a gear wheel of the type disclosed above which will simplify the journaling of the gear wheel in an apparatus and also will provide a shelter effect.

According to the invention, the gear wheel casing is in the form of a capsule comprising a cylindrical wall dimensioned to accommodate a single gear wheel and having an opening which is sufficiently wide to permit mounting of the gear wheel in the capsule and is sufficiently small to provide the capsule with a pronounced tendency to retain a gear wheel placed therein for permitting easy handling of the capsule and the gear wheel as a unit. Moreover, the cylindrical capsule wall has such an inner diameter that the gear wheel, for which the capsule is dimensioned, projects, after its insertion in the capsule, through the opening with a sufficiently great portion of its circumference to permit engagement with another gear wheel outwardly of the capsule; the capsule also comprising end walls for axially retaining the gear wheel, at least one of the end walls having an opening which is provided to permit insertion of a gear wheel shaft.

One embodiment of the present invention will be described in greater detail hereinbelow with reference to the accompanying drawing in which.

Figure 1:
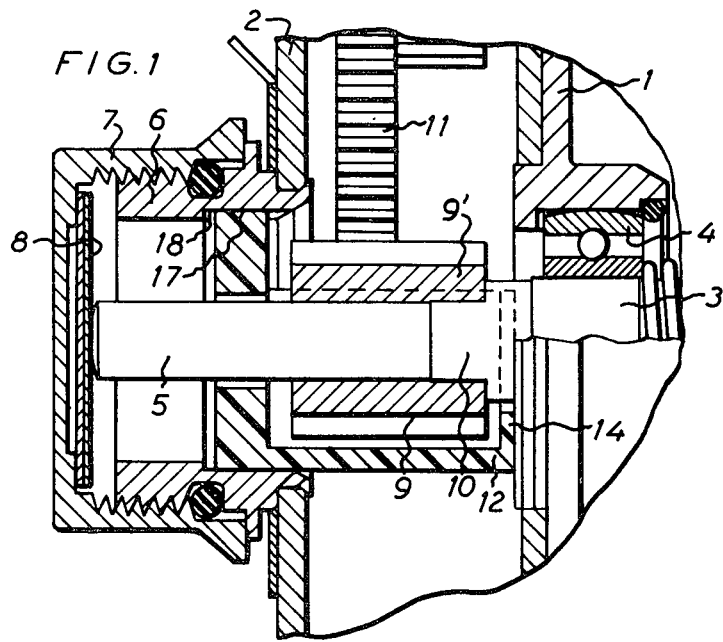
FIG. 1 is a fragmentary longitudinal section of a gear housing of a spinning reel and shows a gear wheel capsule according to the present invention mounted in the gear housing and partially enclosing a gear wheel connected to the shaft of a rotatable reel spool and engaging another gear wheel.

In FIG. 1 there is shown a portion of a spinning reel comprising an inner end wall 1 and an outer end wall 2 which forms a gear housing in which is mounted at least a pair of gear wheels. A shaft 3 of a reel spool (not shown) is journalled in the inner end wall by means of a bearing 4. The shaft 3 has an end extension 5 which extends through the gear housing and into a socket 6 mounted on the outer end wall 2 of the gear housing, this socket supporting on an externally threaded portion an internally threaded rotatable knob 7 by means of which a brake including a friction washer 8 is pressed with adjustable force against the end of the shaft. On the shaft extension 5 is mounted a gear wheel 9 having an end portion 9' which is shaped to form a coupling member for engagement with a mating coupling member 10 formed on the shaft 3 in a merging region of the shaft extension 5. In the case shown the gear wheel 9 is driven by the shaft 3 for driving another gear wheel 11. However, it is conceivable, in a transmission of a type other than that illustrated, to drive the gear wheel 9 by means of the gear wheel 11 for driving the shaft 3.

Two methods are conceivable for the mounting of the above-described gear wheel 9. In the first method the gear wheel could be inserted in place on the end portion 5 of the shaft 3 from the outside, which would, however, require that the adjustment knob 7 first be removed and that the gear wheel, after mounting, be fixed axially to prevent it from moving into the socket 6. In the second method, the shaft 3 with its end portion 5 is slid into the gear wheel 9, this requiring that the gear wheel 9 be held in the correct position in the gear housing during this operation. As in the first case the gear wheel 9 has to be axially fixed on the shaft.

Many arrangements are possible for the axial fixing of the gear wheel 9 but regardless of the arrangement selected, it is essential that the gear wheel be rotatable with as little friction as possible, and this aspect will of course give some limitations and possibly complicate the mounting of the gear wheel.

Figure 2:
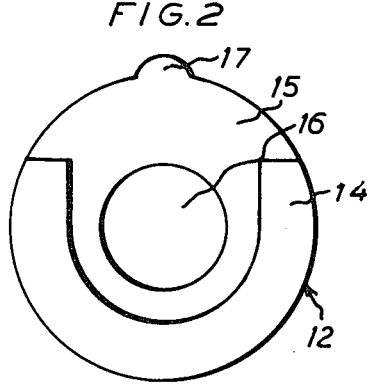
FIG. 2 is an end elevation of the gear wheel capsule.
Figure 3:
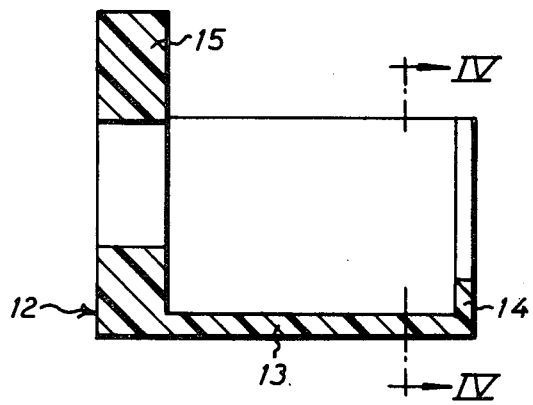
FIG. 3 is an axial section of the gear wheel capsule.
Figure 4:
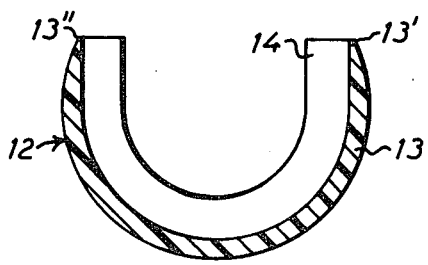
FIG. 4 is a cross-section taken along the line IV—IV in FIG. 3.

Therefore, according to the invention, the gear wheel 9 is supported in a capsule 12 of a construction shown in detail in FIGS. 2–4 and is mounted in the gear housing in the manner which will be apparent from the following description.

The gear wheel capsule 12 comprises a cylindrical wall 13 which has substantially C-shaped cross section and describes slightly more than half of a circumference of a circle, leaving a sufficiently large opening for the insertion of the gear wheel 9 in the capsule. The cylindrical inner side of the wall 13 is dimensioned to surround the gear wheel 9 with a small amount of play and such that the gear wheel 9, after insertion in the gear wheel capsule 12, protrudes out through the opening in the wall 13 with a portion of its periphery (see FIG. 1) for engaging the gear wheel 11. Of course, the wall 13 is also dimensioned in such a way that its edges 13', 13" at the opening are free of the gear wheel 11 mounted in the gear housing outwardly of the capsule 12.

For axial retention of the gear wheel 9 in place, the capsule 12 has two end walls 14, 15 one of which, that is the axially inner end wall 14 in the position of the capsule 12 shown in FIG. 1, is in the form of a radially inwardly directed C-shaped end flange describing a circle arc which is coextensive with the C-section of the wall 13. The inner peripheral edge of the C-shaped flange 14 is of such diameter as to surround the shaft 3 with a certain amount of play. The opposite end wall 15 may be in the form of a circular disc. In view of the fact that the shaft 3 in the construction shown in FIG. 1 is to extend with its end portion 5 through and out of the gear wheel for cooperation with the braking mechanism 7, 8 in FIG. 1, the end wall 15 has a central opening 16 to allow passage of the shaft portion 5. With the correct dimensioning of the opening in the wall 13, the gear wheel 9 can easily be lodged in the gear wheel capsule 12 and thereafter be retained therein to permit handling of the capsule 12 and the gear wheel as a unit, since the only position in which the gear wheel can fall out of the capsule 12 is a position in which the capsule is turned such that the opening faces downwardly. It is of course, easily possible in this position to prevent the gear wheel from falling out of the housing by holding the gear wheel in place with a finger.

The outer dimensions of the gear wheel 9 and its capsule 12 are in this case estimated for the space available in the gear wheel housing between the walls 1, 2 of the spinning reel and the socket 6. More precisely, the gear wheel capsule 12 is of such a length that, after mounting in place, it extends from the inner side of the inner end wall 1 and into the inner end portion of the socket 6 through an opening formed in the outer end wall 2 and in which the socket 6 is fitted with its inner end. The axially outer end wall 15 of the gear wheel capsule 12 is dimensioned to be accommodated by slide fitting in the socket 6 and has a projection 17 which is to be inserted in a guide groove 18 provided on the inner side of the socket 6. The projection 17 and the guide groove 18 ensure that the capsule 12 can be inserted in the socket 6 only in correct angular position of the gear wheel 9 for engagement with the gear wheel 11 which is rotatably mounted on a shaft (not shown) journalled for example in the outer gear housing wall 2.

After lodging of the gear wheel 9 in the gear wheel capsule 12, the capsule is fitted with its one end portion in the socket 6 by being inserted therein from the inner side of the wall 2, the correct angular position of the capsule 12 being ensured by the engagement of the projection 17 in the guide groove 18 and the correct axial position being achieved when the projection 17 reaches a shoulder at the end of the guide groove 18. On insertion of the capsule in place, the gear wheel 9 is automatically moved into engagement with the gear wheel 11. In the illustrated embodiment, the gear wheel 9 has relatively long gear-teeth, but the gear wheel need not have longer gear-teeth than is required for satisfactory engagement with the gear wheel 11.

After the above-described mounting operation, the gear wheel capsule 12 is retained with satisfactory reliability in place during the subsequent handling of the outer end wall 2 for mounting on the inner end wall 1, during which time the gear wheel 9 is simultaneously moved on the end portion 5 of the shaft into engagement with the coupling member 10. Three factors ensure a reliable retention of the gear wheel capsule in the correct coaxial position relative to the gear wheel 9; namely the fit between the socket 6 and the end of the gear wheel capsule 12 inserted in the socket, the abutment of the capsule against the opposite end of the inner end wall 1 and the engagement of the projection 17 in the guide groove 18. After being mounted, the gear wheel 9 is supported on the end portion 5 of the shaft 3. The play between the wall 13 and the gear wheel ensures the prevention of unnecessary friction.

The embodiment of the gear wheel capsule can naturally be modified in dependence upon the form of the gear wheel and the method of its connection or coupling to the shaft. If the gear wheel is to be connected to a shaft which is only to extend into the gear wheel capsule, only one end wall 14 or 15 of the gear wheel capsule need have an opening for the shaft. For example, the end wall 15 can be completely sealing at the one end of the wall 13, or otherwise the flange 14 could form a continuous wall instead of following the C-shaped cross-sectional contour of the wall 13. As shown in FIG. 1, the gear wheel 9 is supported on the shaft portion 5 without any axial support against the end wall 15 of the gear wheel capsule, but with a minor shifting of the gear wheel to the left in relation to FIG. 1 the gear wheel will reach the end wall 15, whereupon further shifting is prevented. In the event of contact between the gear wheel and the end wall 15, the friction of the gear wheel will be small since the gear wheel, in the illustrated embodiment, is cast integrally in a plastic suited to the contemplated purpose, such as acetate plastic.

What I claim and desire to secure by Letters Patent is:

1. In a device, such as a fishing reel, having a gear housing, the combination in said housing of a gear casing and a gear, said gear casing being formed as a capsule comprising a cylindrical wall having an opening formed therein so that said wall is C-shaped in cross-section, the inner radius of curvature of said cylindrical wall being slightly more than the outer radius of curvature of said gear and said opening formed therein being sufficient to permit the insertion of said gear through said wall, said cylindrical wall corresponding in length to the axial dimension of said gear, said capsule further having disc-shaped end walls on said cylindrical wall to limit axial movement of said gear, at least one of said end walls having an opening formed therein to permit insertion of a shaft to engage said gear, said opening in said cylindrical wall being further of sufficient circumferential dimension to permit engagement of said gear by a further gear outside said capsule, whereby said capsule with said gear may be assembled in said gear housing as a unit.

2. The combination in accordance with claim 1 further characterized in that said gear housing has a wall, a receptacle formed in said wall to receive one end wall of said capsule, means formed in said capsule, further cooperating mating means formed on said end wall to engage said formed means in said capsule to prevent angular rotation of said capsule when in said receptacle.

3. A fishing reel having a gear housing, a rotatable line spool having a shaft rotatably journaled in and extending from said gear housing, said shaft having within said gear housing a coupling, a gear adapted to couple with said shaft within said housing, a gear casing formed as a capsule about said gear, said capsule comprising a curved wall whose inner radius of curvature is slightly larger than the radius of curvature of said gear, said wall having an aperture formed therein so that said wall is C-shaped in cross-section, the length of said curved wall corresponding to the axial length of said gear, end walls secured to said curved wall, at least one of said end walls adjacent the coupling end of said shaft having an aperture formed therein to receive said shaft, at least one of said end walls having formed thereon a mateable surface, means provided within said gear housing to support a receptacle, said receptacle being formed to receive the end wall of said capsule and having a mating surface in said receptacle to engage said mateable surface on said end wall of said capsule to prevent angular rotation of said capsule, a further gear mounted on a shaft journaled within said gear housing positioned and arranged to engage said first-named gear through said opening in said cylindrical wall of said capsule, said opening being formed of sufficient circumferential extent to permit such engagement of said gears.

4. The combination according to claim 3 and further characterized in that said gear housing has a member supported within said housing and spaced from said receptacle to engage the other of said end walls distant from said receptacle to cooperate with said receptacle to limit axial movement of said capsule.

* * * * *